United States Patent
Rezayee et al.

(10) Patent No.: US 10,198,727 B1
(45) Date of Patent: Feb. 5, 2019

(54) MODULATION OF A NEAR-FIELD COMMUNICATION SIGNAL

(71) Applicant: Square, Inc., San Francisco, CA (US)

(72) Inventors: Afshin Rezayee, Richmond Hill (CA); Jason Binder, San Francisco, CA (US); Emad Bidari, Toronto (CA)

(73) Assignee: Square, Inc., San Francisco, CA (US)

(*) Notice: Subject to any disclaimer, the term of this patent is extended or adjusted under 35 U.S.C. 154(b) by 671 days.

(21) Appl. No.: 14/865,789

(22) Filed: Sep. 25, 2015

(51) Int. Cl.
*G06Q 20/32* (2012.01)
*H04L 27/12* (2006.01)

(52) U.S. Cl.
CPC ......... *G06Q 20/3278* (2013.01); *H04L 27/12* (2013.01)

(58) Field of Classification Search
CPC .......................... G06Q 20/3278; H04L 27/12
See application file for complete search history.

(56) References Cited

U.S. PATENT DOCUMENTS

| | | | |
|---|---|---|---|
| 6,631,165 B1 * | 10/2003 | Lambert | H04H 20/14 360/60 |
| 7,309,012 B2 | 12/2007 | Von Mueller et al. | |
| 7,343,317 B2 | 3/2008 | Jokinen et al. | |
| 7,471,204 B2 | 12/2008 | Safarian et al. | |
| 7,945,494 B2 | 5/2011 | Williams | |
| 7,945,949 B2 | 5/2011 | Johnson | |
| 8,280,347 B2 | 10/2012 | Azimi et al. | |
| 8,336,771 B2 | 12/2012 | Tsai et al. | |
| 8,573,486 B2 | 11/2013 | McKelvey et al. | |
| 8,798,537 B2 | 8/2014 | Lee et al. | |
| 8,876,003 B2 | 11/2014 | McKelvey | |
| 9,047,598 B1 | 6/2015 | McKelvey et al. | |
| 9,235,735 B2 * | 1/2016 | Peters | G06K 7/0008 |
| 9,250,452 B1 * | 2/2016 | Yap | G02B 6/4279 |
| 9,256,769 B1 | 2/2016 | Lamfalusi et al. | |
| 9,306,401 B2 | 4/2016 | Lee et al. | |
| 9,396,368 B2 | 7/2016 | Lamba et al. | |
| 9,438,300 B1 | 9/2016 | Oliaei | |
| 9,443,237 B2 | 9/2016 | McKelvey et al. | |
| 9,460,322 B2 | 10/2016 | Lamfalusi et al. | |
| 9,485,092 B2 | 11/2016 | Smets et al. | |
| 9,503,178 B2 | 11/2016 | Lee et al. | |
| 9,646,299 B1 * | 5/2017 | Rezayee | G06Q 20/3278 |
| 9,760,883 B1 | 9/2017 | Wade | |

(Continued)

FOREIGN PATENT DOCUMENTS

| | | |
|---|---|---|
| WO | 2015/128422 A1 | 9/2015 |
| WO | 2016/191299 A2 | 12/2016 |

OTHER PUBLICATIONS

Notice of Allowance dated Jan. 11, 2017, for U.S. Appl. No. 14/866,128, of Rezayee, A., et al., filed Sep. 25, 2015.

(Continued)

*Primary Examiner* — Lewis West
(74) *Attorney, Agent, or Firm* — Maynard Cooper & Gale, LLP; Chitra M. Kalyanaraman, Esq.

(57) ABSTRACT

A communication device has a processing unit, a transmit circuit, and an antenna. The processing unit generates a carrier signal and modifies the carrier signal based on a notch modulation procedure having notch delay and a notch width. The notch width is selected based on a desired modulation index. The resulting modulation signal is provided to the transmit circuit, which generates a wireless data signal that is transmitted by the antenna.

25 Claims, 9 Drawing Sheets

(56) References Cited

U.S. PATENT DOCUMENTS

| | | | |
|---|---|---|---|
| 9,781,549 | B2 | 10/2017 | Lamba et al. |
| 9,936,337 | B2 | 4/2018 | Lamba et al. |
| 2004/0104268 | A1 | 6/2004 | Bailey |
| 2005/0212693 | A1* | 9/2005 | Friedrich ............ G06K 7/0008 342/42 |
| 2005/0242173 | A1 | 11/2005 | Suzuki |
| 2005/0242927 | A1* | 11/2005 | Friedrich ............ G06K 7/0008 340/10.2 |
| 2005/0247787 | A1 | 11/2005 | Von Mueller et al. |
| 2005/0287966 | A1 | 12/2005 | Yoshimi et al. |
| 2006/0097874 | A1* | 5/2006 | Salesky ............ G08B 13/2417 340/572.1 |
| 2006/0109123 | A1 | 5/2006 | Carrender |
| 2006/0125598 | A1* | 6/2006 | Fischer ............ G06K 7/0008 340/3.4 |
| 2006/0125605 | A1* | 6/2006 | Fischer ............ G06K 7/0008 340/10.41 |
| 2006/0287964 | A1 | 12/2006 | Brown |
| 2007/0025456 | A1* | 2/2007 | McCrady ............ H04L 5/02 375/260 |
| 2007/0030126 | A1* | 2/2007 | Friedrich ............ G06K 7/0008 340/10.2 |
| 2007/0090927 | A1 | 4/2007 | Potyrailo et al. |
| 2007/0287498 | A1 | 12/2007 | Wang et al. |
| 2008/0177662 | A1 | 7/2008 | Smith et al. |
| 2008/0237345 | A1 | 10/2008 | Moullette et al. |
| 2009/0215394 | A1 | 8/2009 | Dewan |
| 2010/0148928 | A1 | 6/2010 | Yeager et al. |
| 2010/0191653 | A1 | 7/2010 | Johnson et al. |
| 2010/0277003 | A1 | 11/2010 | Von Novak et al. |
| 2010/0314446 | A1 | 12/2010 | Morley, Jr. |
| 2011/0086601 | A1 | 4/2011 | Ali et al. |
| 2011/0112920 | A1 | 5/2011 | Mestre et al. |
| 2011/0160896 | A1 | 6/2011 | Kim |
| 2011/0165896 | A1 | 7/2011 | Stromberg et al. |
| 2011/0174879 | A1 | 7/2011 | Morley, Jr. |
| 2011/0198395 | A1 | 8/2011 | Chen |
| 2012/0086284 | A1 | 4/2012 | Capanella et al. |
| 2012/0095867 | A1 | 4/2012 | McKelvey |
| 2012/0193434 | A1 | 8/2012 | Grigg et al. |
| 2012/0203610 | A1 | 8/2012 | Grigg et al. |
| 2013/0035051 | A1 | 2/2013 | Mujtaba et al. |
| 2013/0040560 | A1 | 2/2013 | Kennedy et al. |
| 2013/0073373 | A1 | 3/2013 | Fisher |
| 2013/0109446 | A1 | 5/2013 | Phillips |
| 2013/0248601 | A1 | 9/2013 | Liang et al. |
| 2014/0061301 | A1 | 3/2014 | Cho et al. |
| 2014/0101056 | A1 | 4/2014 | Wendling |
| 2014/0127995 | A1 | 5/2014 | Hendricksen et al. |
| 2014/0129425 | A1 | 5/2014 | Yang et al. |
| 2014/0138435 | A1 | 5/2014 | Khalid |
| 2014/0187153 | A1 | 7/2014 | Zhu et al. |
| 2014/0279546 | A1 | 9/2014 | Poole et al. |
| 2014/0302788 | A1 | 10/2014 | McKelvey |
| 2014/0328488 | A1 | 11/2014 | Caballero et al. |
| 2015/0118956 | A1 | 4/2015 | Desai et al. |
| 2015/0162785 | A1 | 6/2015 | Lee et al. |
| 2015/0195008 | A1 | 7/2015 | Johnson et al. |
| 2015/0249485 | A1 | 9/2015 | Ouyang et al. |
| 2015/0287022 | A1 | 10/2015 | Granbery |
| 2015/0332240 | A1 | 11/2015 | Harwood et al. |
| 2015/0332248 | A1 | 11/2015 | Weksler et al. |
| 2015/0341073 | A1 | 11/2015 | Ayala Vazquez et al. |
| 2015/0355251 | A1 | 12/2015 | Pascolini |
| 2016/0050629 | A1 | 2/2016 | Khesbak et al. |
| 2016/0126619 | A1 | 5/2016 | Tenbroek et al. |
| 2016/0142174 | A1 | 5/2016 | Fine et al. |
| 2016/0147239 | A1 | 5/2016 | Yan et al. |
| 2016/0156327 | A1* | 6/2016 | Wang ............ H03H 7/461 333/132 |
| 2016/0210613 | A1 | 7/2016 | McGill |
| 2016/0232515 | A1 | 8/2016 | Jhas et al. |
| 2017/0200152 | A1 | 7/2017 | Winkler et al. |
| 2017/0290079 | A1 | 10/2017 | Raj et al. |

OTHER PUBLICATIONS

Non-Final Office Action dated Aug. 5, 2016, for U.S. Appl. No. 14/866,128, of Rezayee, A., et al., filed Sep. 25, 2015.

Hao, H., et al., "A Parallel Topology for Inductive Power Transfer Power Supplies," IEEE Transactions on Power Electronics, vol. 29, No. 3, pp. 1140-1151 (Mar. 2014).

Non-Final Office Action dated Jan. 6, 2016, for U.S. Appl. No. 14/866,128, of Rezayee, A., et al., filed Sep. 25, 2015.

Gebhart, M., et al., "Automated Antenna Impedance Adjustment for Near Field Communication (NFC)," 12th International Conference on Telecommunications (ConTEL), pp. 235-242 (Jun. 26-28, 2013).

Non-Final Office Action dated Apr. 10, 2015, for U.S. Appl. No. 14/189,997, of Lamfalusi, M., et al., filed Feb. 25, 2014.

Non-Final Office Action dated Apr. 13, 2015, for U.S. Appl. No. 14/641,080, of McKelvey, J., M., et al., filed Mar. 6, 2015.

Notice of Allowance dated Aug. 18, 2015, for U.S. Appl. No. 14/641,080, of McKelvey, J., M., et al., filed Mar. 6, 2015.

Non-Final Office Action dated Nov. 20, 2015, for U.S. Appl. No. 14/641,080, of McKelvey, J.M., et al., filed Mar. 6, 2015.

Notice of Allowance dated Nov. 23, 2015 for U.S. Appl. No. 14/189,997, of Lamfalusi, M., et al., filed Feb. 25, 2014.

Non-Final Office Action dated Nov. 25, 2015, for U.S. Appl. No. 14/868,261, of Lamba, K., et al., filed Sep. 28, 2015.

Non-Final Office Action dated Feb. 25, 2016, for U.S. Appl. No. 14/979,407, of Lamfalusi, M., et al., filed Dec. 27, 2015.

Final Office Action dated Mar. 9, 2016, for U.S. Appl. No. 14/641,080, of McKelvey, J. M., et al., filed Mar. 6, 2015.

Notice of Allowance dated Mar. 18, 2016, for U.S. Appl. No. 14/868,261, of Lamba, K., et al., filed Sep. 28, 2015.

Notice of Allowance dated May 23, 2016, for U.S. Appl. No. 14/641,080, of McKelvey, J.M., et al., filed Mar. 6, 2015.

Notice of Allowance dated Jun. 13, 2016, for U.S. Appl. No. 14/979,407, of Lamfalusi, M., et al., filed Dec. 27, 2015.

Non-Final Office Action dated Oct. 25, 2016, for U.S. Appl. No. 14/868,247, of Lamba, K., et al., filed Sep. 28, 2015.

Non-Final Office Action dated Dec. 8, 2016, for U.S. Appl. No. 14/986,308, of Wade, J., filed Dec. 31, 2015.

Non-Final Office Action dated Jan. 25, 2017, for U.S. Appl. No. 15/094,598, of Lamba, K., et al., filed Apr. 8, 2016.

Final Office Action dated Mar. 21, 2017, for U.S. Appl. No. 14/868,247, of Lamba, K., et al., filed Sep. 28, 2015.

Notice of Allowance dated Apr. 28, 2017, for U.S. Appl. No. 14/986,308, of Wade, J., filed Dec. 31, 2015.

Advisory Action dated May 26, 2017, for U.S. Appl. No. 14/868,247, of Lamba, K., et al., filed Sep. 28, 2015.

Notice of Allowance dated May 31, 2017, for U.S. Appl. No. 15/094,598, of Lamba, K., et al., filed Apr. 8, 2016.

Corrected Notice of Allowance dated Aug. 10, 2017, for U.S. Appl. No. 14/986,308, of Wade, J., filed Dec. 31, 2015.

Notice of Allowance dated Nov. 20, 2017, for U.S. Appl. No. 14/868,247, of Lamba, K., et al., filed Sep. 28, 2015.

Non-Final Office Action dated Feb. 12, 2018, for U.S. Appl. No. 14/859,034, of White, M. W., et al., filed Sep. 18, 2015.

Non-Final Office Action dated Apr. 20, 2018, for U.S. Appl. No. 14/858,940, of Grassadonia, B., et al., filed Sep. 18, 2015.

International Search Report and Written Opinion for International Patent Application No. PCT/US2016/033601, dated Nov. 22, 2016.

* cited by examiner

MODULATION OF A NEAR-FIELD COMMUNICATION SIGNAL

BACKGROUND

Near field communication ("NFC") devices are capable of communicating when they are placed in close proximity to each other, and may be used for transactions such as payment transactions. Each of the NFC communication devices includes an antenna and related circuitry such as a matching circuit. A first NFC communication device generates a wireless carrier signal at a suitable frequency such as 13.56 MHz and transmits that signal over its antenna. When the antenna of a second NFC communication device is placed in close proximity to the antenna of the first NFC communication device, the two devices become inductively coupled, such that energy is coupled between the two devices through a shared magnetic field.

When the two NFC communication devices are inductively coupled, either of the NFC communication devices may modify the wireless carrier signal. The first NFC communication device may modify the wireless carrier signal prior to transmission. These modifications change the amplitude and/or frequency of the wireless carrier signal in order to encode data that is transmitted to the second NFC communication device. The second NFC communication device also encodes data that is transmitted to the first NFC communication device. Because the second NFC communication device is not transmitting the wireless carrier signal, it cannot modify the signal prior to transmission. Instead, it changes a load applied to its antenna, thus modifying the magnetic field between the two NFC devices. This results in changes to the wireless carrier signal, which the second NFC communication device uses to encode data that is transmitted to the first NFC communication device.

The magnetic field between the NFC communication devices also depends on the relative position and physical packaging of the NFC communication devices. The magnetic field changes based on how close the devices are to each other as well as the orientation of the devices. One or both of the devices may be packaged within metals or non-conductive materials that impact that magnetic field. In some cases, the relative position and packaging may combine to impact the magnetic field in a complex manner, for example, when two devices are placed in close proximity to each other and the packaging of one of the devices includes ferrous materials. Because the relative position between the NFC devices is typically under human control, as in a payment transaction, the characteristics of the wireless carrier signal that is coupled between the NFC communication devices may be unpredictable or may change while the devices are communicating.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
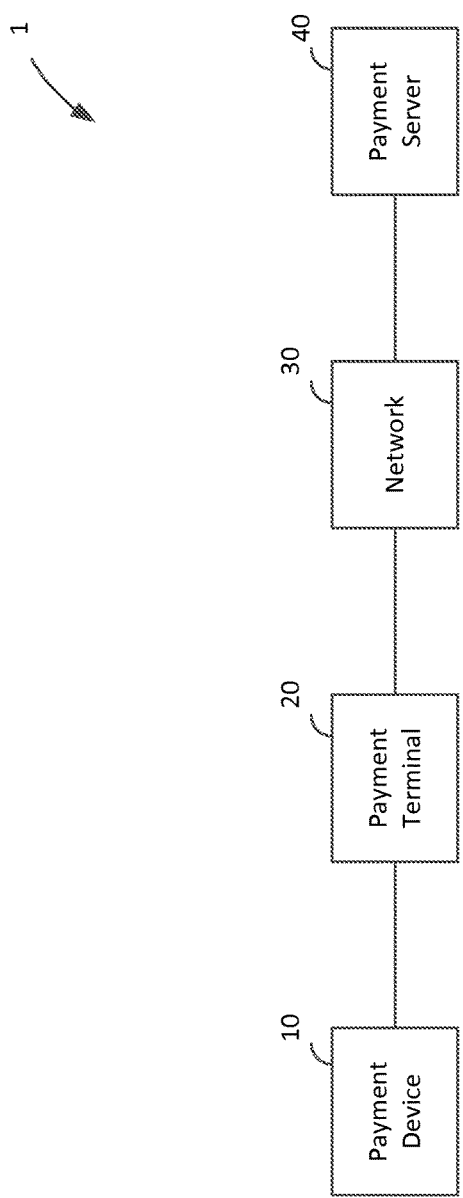
FIG. 1 shows an illustrative block diagram of a payment system in accordance with some embodiments of the present disclosure.

A payment system includes a payment device and a payment reader that are able to communicate with each other using NFC communications. The payment device may be an NFC-enabled smart phone, a chip card such as a Europay/Visa/Mastercard ("EMV") card, or other similar devices. The payment reader generates and transmits a wireless carrier signal. During a payment transaction, a customer places the payment device in close proximity to the payment reader, such that an antenna of the payment device is within the range of the wireless carrier signal. In this manner, the payment device and payment reader become inductively coupled and are able to communicate using a wireless communication protocol.

The payment reader includes a measurement circuit that measures characteristics of an inductively coupled signal that is based on the transmitted wireless carrier signal, such as the signal strength of the inductively coupled signal. These characteristics change based on the inductive coupling between the payment device and the payment reader, which in turn depends on the relative proximity of the two devices and the physical packaging of the devices. The payment reader then modifies the manner in which it transmits signals to the payment device based on these measurements. This may include modifying a characteristic of the wireless carrier signal such as the transmit power, modifying the method that is used to modulate data that is sent to the payment device, other modifications to the operation of the payment reader, or some other combination thereof.

By modifying the manner in which it transmits signals to the payment device, the payment reader is able to dynamically adjust the tuning of the system in order to optimize communications between the payment reader and the payment device. For example, certain procedures for modulating data at the payment reader may be better suited for certain situations. Thus, in one embodiment the payment reader may select between modulation procedures based on a measurement value determined by the measurement circuit. These modulation procedures may provide alternative methods for producing a modulated signal according to an NFC communication protocol.

One type of modulation procedure may be a notch modulation procedure. Some methods of providing amplitude modulation involve changing the voltage of a signal that is provided to transmit circuitry or changing a duty cycle of a signal that is provided to the transmit circuitry. Changing the voltage requires circuitry that is capable of providing a range of voltages at a high frequency, which may be expensive or difficult to implement. Changing the duty cycle may be simpler, but has been known to result in phase changes that may cause difficulty for a payment device attempting to demodulate a wireless data signal generated in this manner. Notch modulation may modulate the amplitude of the wireless carrier signal based on a modulation procedure that does not require a change in voltage and that produces a signal having a similar overall pulse width as the carrier signal. In order to modulate the amplitude, a notch is placed within each pulse that corresponds to the amplitude modulated data. The location of the notch is based on a notch delay from the beginning of the pulse while a notch width determines the size of the notch. A modulation index for a wireless data signal that is transmitted using notch modulation may be modified based on the notch delay and the notch width.

Another type of modulation procedure may be a delayed H-bridge modulation procedure. An H-bridge may selectively supply a voltage or ground to first and second portions of a transmit circuit of the payment reader. In a delayed H-bridge modulation procedure each of the first and second portions of the transmit circuit may be supplied the same voltage during a transition period between states. For example, prior to a transition of the first portion of the transmit circuit of the payment reader from the voltage to ground, the second portion of the transmit circuit of the payment reader may be connected to the same voltage. In a similar manner, prior to a transition of the first portion of the transmit circuit of the payment reader from ground to the voltage, the second portion of the transmit circuit of the payment reader may also be connected to ground.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as an NFC payment device, information about the approved transaction and additional information (e.g., receipts, special offers, coupons, or loyalty program information) may be provided to the NFC payment device for display at a screen of the smart phone or watch or storage in memory.

Figure 2:
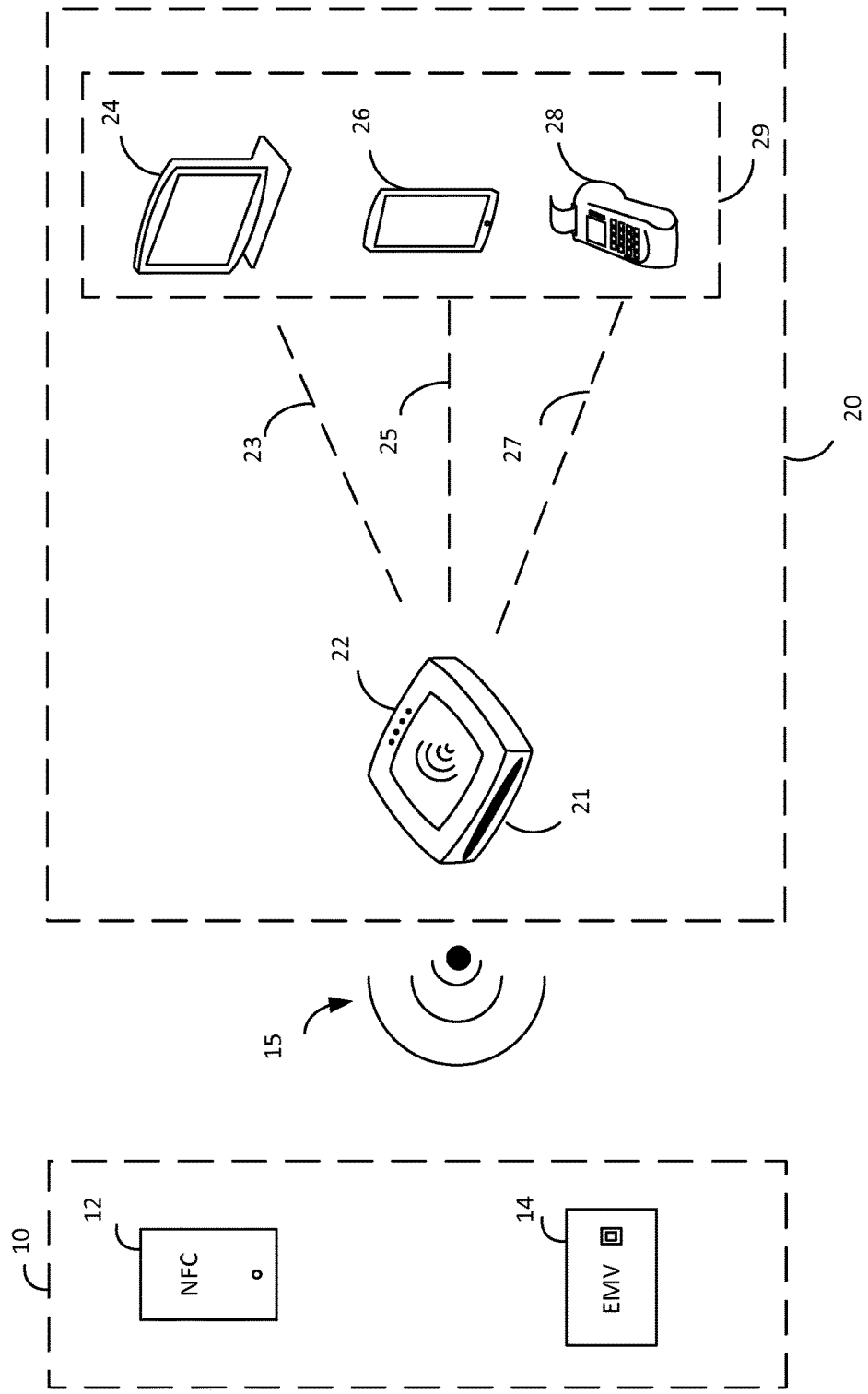
FIG. 2 depicts an illustrative block diagram of payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. The payment reader 22 of payment terminal 20 may facilitate transactions between the payment device 10 and a merchant device 29 running a point-of-sale application.

In one embodiment, payment device 10 may be a device that is capable of communicating with payment terminal 20 (e.g., via payment reader 22), such as an NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via a Bluetooth or Bluetooth low energy interface. As described herein, in some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format.

Figure 3:
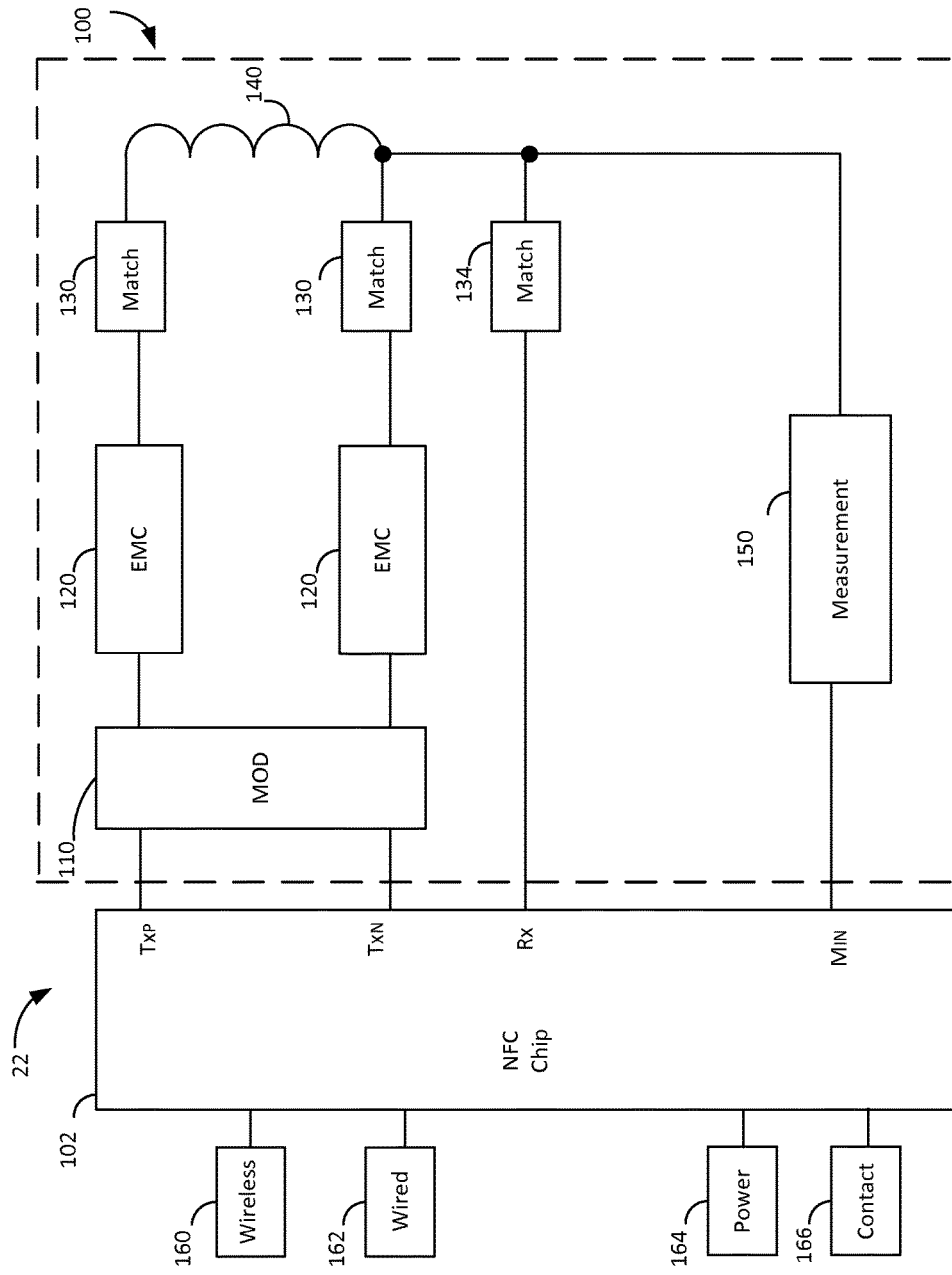
FIG. 3 depicts a block diagram of a payment reader in accordance with some embodiments of the present disclosure.

FIG. 3 depicts a block diagram of payment reader 22 in accordance with some embodiments of the present disclosure. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. Among other functions, payment reader 22 may operate as a NFC communication device for exchanging data with a contactless payment device such payment device 10. In one embodiment, payment reader 22 includes NFC chip 102, NFC circuit 100, wireless communication interface 160, wired communication interface 162, power supply 164, and contact interface 166.

NFC chip 102 of payment reader 22 may include any suitable hardware, software, memory, and circuitry as is necessary to perform and control the functions of payment reader 22. In one embodiment, NFC chip 102 includes a processing unit including one or more processors that execute instructions stored in memory of NFC chip 102 to control the operations and processing of payment reader 22. As used herein, a processing unit may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In an exemplary embodiment, NFC chip 102 may include two RISC processors configured to perform general processing and cryptographic processing functions, respectively, based on executable instructions stored in respective memory. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

NFC chip 102 may also include additional circuitry such as interface circuitry, analog front end circuitry, and security circuitry. In one embodiment, interface circuitry may include circuitry for interfacing with a wireless interface 160 (e.g., Wi-Fi, Bluetooth, and Bluetooth low energy), circuitry for interfacing with a wired interface 162 (e.g., USB, Ethernet, FireWire, and lightning), circuitry for interfacing with other communication interfaces or buses (e.g., I²C, SPI, UART, and GPIO), circuitry for interfacing with a power interface 164 (e.g., power management circuitry, power conversion circuitry, rectifiers, and battery charging circuitry), and circuitry for interfacing with a contact interface 166 (e.g., power and communication circuitry for directly interfacing with an EMV chip of a chip card 14 that is inserted in slot 21).

In one embodiment, analog front end circuitry of NFC chip 102 includes circuitry for interfacing with the analog components of NFC circuit 100 (e.g., electromagnetic compatibility (EMC) circuitry, matching circuits, modulation circuitry, and measurement circuitry). Security circuitry of NFC chip 102 may include circuitry for protecting sensitive information such as encryption keys, merchant information, and customer information. In one embodiment, security circuitry may include tamper protection circuitry and electronic fuses for selectively cutting off power or disabling one or more components of NFC chip in response to attempts to obtain improper access to NFC chip 102.

Wireless interface 160 includes hardware and software for communicating with external electronic devices wirelessly, such as Wi-Fi, Bluetooth, or Bluetooth low energy. Wired Interface 162 includes hardware, software, and a physical interface to facilitate wired communications with an external electronic device via an interface such as USB, Ethernet, FireWire, or lightning. Using the wireless interface 160 and wired interface 162, payment reader 22 may communicate with external electronic devices such as a merchant device 29. In some embodiments, payment reader 22 may communicate with other electronic devices such as a remote server (e.g., to provide payment or transaction information directly to the server, receive updates from a server, or communicate certification or approval data with the server), or with another electronic device.

Power supply 164 may include one or more power supplies such as a physical connection to AC power or a battery. Power supply 164 may include power conversion circuitry for converting AC power and/or generating a plurality of DC voltages for use by components of payment reader 22. When power supply 164 includes a battery, the battery may be charged via a physical power connection, via inductive charging, or via any other suitable method.

Contact interface 166 may be a suitable interface for providing power to a payment chip such as an EMV chip of a chip card 14 and communicating with the EMV chip. Contact Interface 166 may include a plurality of contact pins for physically interfacing with the chip card 14 according to EMV specifications.

NFC chip 102 of payment reader 22 is in communication with NFC circuit 100 via a plurality of pins such as a positive transmit pin ($T_{XP}$), negative transmit pin ($T_{XN}$), a receive pin (Rx), and a measurement pin ($M_{IN}$). Transmit pins $T_{XP}$ and $T_{XN}$ may provide output signals having an amplitude, frequency, and waveform. In one embodiment, the signals provided from $T_{XP}$ and $T_{XN}$ may be differential square wave signals and may be provided to modulation circuit 110 of NFC circuit 100.

Modulation circuit 110 may include circuitry (e.g., H-bridge circuitry) for outputting a modulated signal in accordance with the outputs of $T_{XP}$ and $T_{XN}$. Modulation circuit 110 may also perform other functions such as applying an increased voltage that is suitable for transmission over antenna 140. The output of modulation circuit 110 may be provided to EMC circuit 120. EMC circuit 120 may include one or more components such inductors and capacitors in order to provide acceptable electromagnetic compatibility with other high-frequency signals. The output of EMC circuit 120 may be provided to matching circuit 130. Matching circuit 130 may include suitable components such as resistors, inductors, and capacitors to provide for impedance matching and tuning of antenna 140.

Collectively, the modulation circuit 110, EMC circuit 120, and matching circuit 130 may form a transmit circuit that is coupled to antenna 140. However, it will be understood that the transmit circuit may include any suitable circuitry that couples the NFC chip 102 (e.g., the outputs of the processing unit thereof as indicated by the $T_{XP}$ and $T_{XN}$ pins), that the circuit components depicted in FIG. 3 may be arranged in any suitable manner, and that any suitable components may be added or omitted therefrom.

During operation of NFC chip 102 of payment reader 22, transmit pins $T_{XP}$ and $T_{XN}$ may output either a carrier signal or a modulated signal. A carrier signal may be a signal having a fixed frequency such as 13.56 MHZ. The carrier signal is provided to modulation circuit 110 which may modify the output signal from NFC chip 102 in a uniform manner (e.g., by applying a voltage boost). Components of EMC circuit 120 and matching circuit 130 (e.g., resistors, inductors, and capacitors) modify the output waveform of the carrier signal, for example, by modifying the approximate square wave output such that the signal transmitted by the antenna 140 approximates a sine wave having the carrier frequency. A first portion of the transmit circuit thus couples the output of the $T_{XP}$ pin to a first terminal of antenna 140 while a second portion of the transmit circuit couples the output of the $T_{XN}$ pin to a second terminal of antenna 140. The carrier signal is then transmitted over antenna 140 as a wireless carrier signal.

When modulation is applied to the carrier signal by NFC chip 102, modulation circuit 110 may output a modulated signal that varies from the carrier signal in its amplitude, phase, or both in response to a data signal. As is described herein, NFC chip 102 may implement a modulation procedure in order to generate the modulated signal, either alone or in combination with the modulation circuit 110. This modulated signal is provided to the transmit circuit and transmitted over antenna 140 as a wireless data signal.

NFC chip 102 monitors the signal at antenna 140 through receive pin Rx. The receive pin Rx is coupled to a receive circuit, which in one embodiment may include matching circuit 134 and may be coupled to a second terminal of antenna 140. In this manner, NFC chip 102 may monitor what is being transmitted (e.g., the wireless carrier and modulated signals) as well as changes that are applied to the carrier signal by a contactless payment device 10 such as NFC device 12 or chip card 14. Based on these modulations of the received signal, NFC chip 102 is able to receive communications from the contactless payment device 10. In some embodiments, NFC chip 102 may also include a measurement circuit 150 for measuring one or more characteristics of the inductively coupled signal, which includes the wireless carrier signal or a received signal having modulations of the wireless carrier signal. For example, measurement circuit 150 may include circuitry such as an envelope detector for determining the power of the signal at antenna 140, which may correspond to the degree of inductive coupling between payment reader 22 and the contactless payment device 10.

Figure 4:
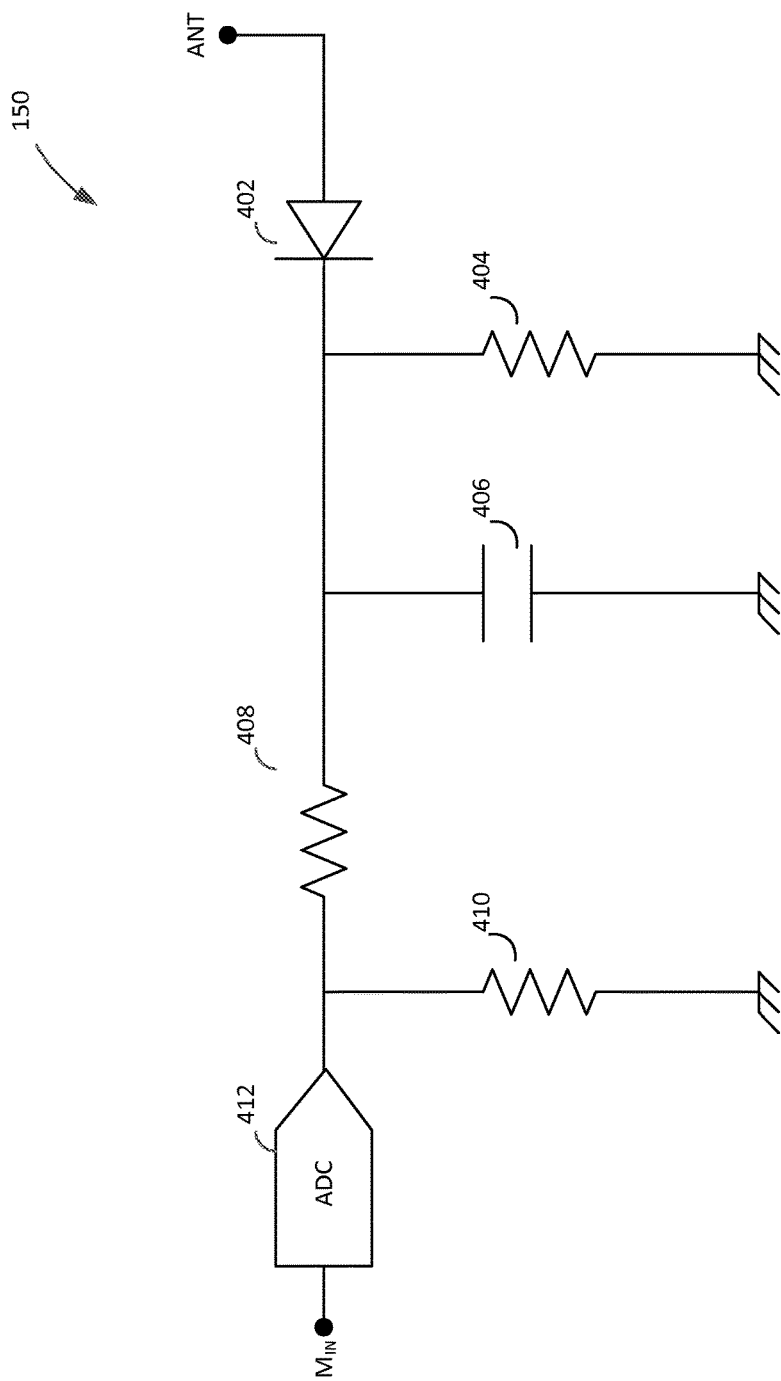
FIG. 4 depicts an exemplary measurement circuit in accordance with some embodiments of the present disclosure.

FIG. 4 depicts an exemplary measurement circuit 150 in accordance with some embodiments of the present disclosure. Measurement circuit 150 may measure any suitable characteristics of the inductively coupled signal (e.g., of the wireless carrier signal or a received signal having modulations of the wireless carrier signal) in order to determine characteristics of the inductively coupled signal. In one embodiment, measurement circuit 150 may generate a signal having a measurement value that corresponds to the signal strength (e.g., received power) for the inductively coupled signal. Although not depicted in FIG. 4, in some embodiments, a measurement circuit 150 or a plurality of measurement circuits 150 may generate a plurality of types of measurement values that may be analyzed by a processing unit of NFC chip 102.

In one embodiment, the measurement circuit 150 may include an envelope detector. The envelope detector may be coupled to the second terminal antenna 140 and may include a diode 402, resistor 404, and capacitor 406. The diode 402 may rectify the periodic signal that is received from the antenna, and the values of resistor 404 and capacitor 406 may be selected such that a suitable envelope is formed between peaks of the periodic signal (e.g., based on the periodic signal having a frequency of approximately 13.56 MHZ). The output from the envelope detector (i.e., the voltage at the shared node of diode 402, resistor 404, and capacitor 406) is provided to resistor 408, resistor 410, and analog-to-digital convertor 412. Resistors 408 and 410 may provide a suitable signal as an input to analog-to-digital converter 412, and analog-to-digital converter 412 may generate a digital signal that is representative of the analog voltage that as provided at the input to the analog-to-digital converter 412. This digital signal may be provided to a processing unit of NFC chip 102 via the measurement value input pin $M_{IN}$ and may represent the characteristics of the measured signal. The processing unit may determine a measurement value based on this input.

Figure 5:
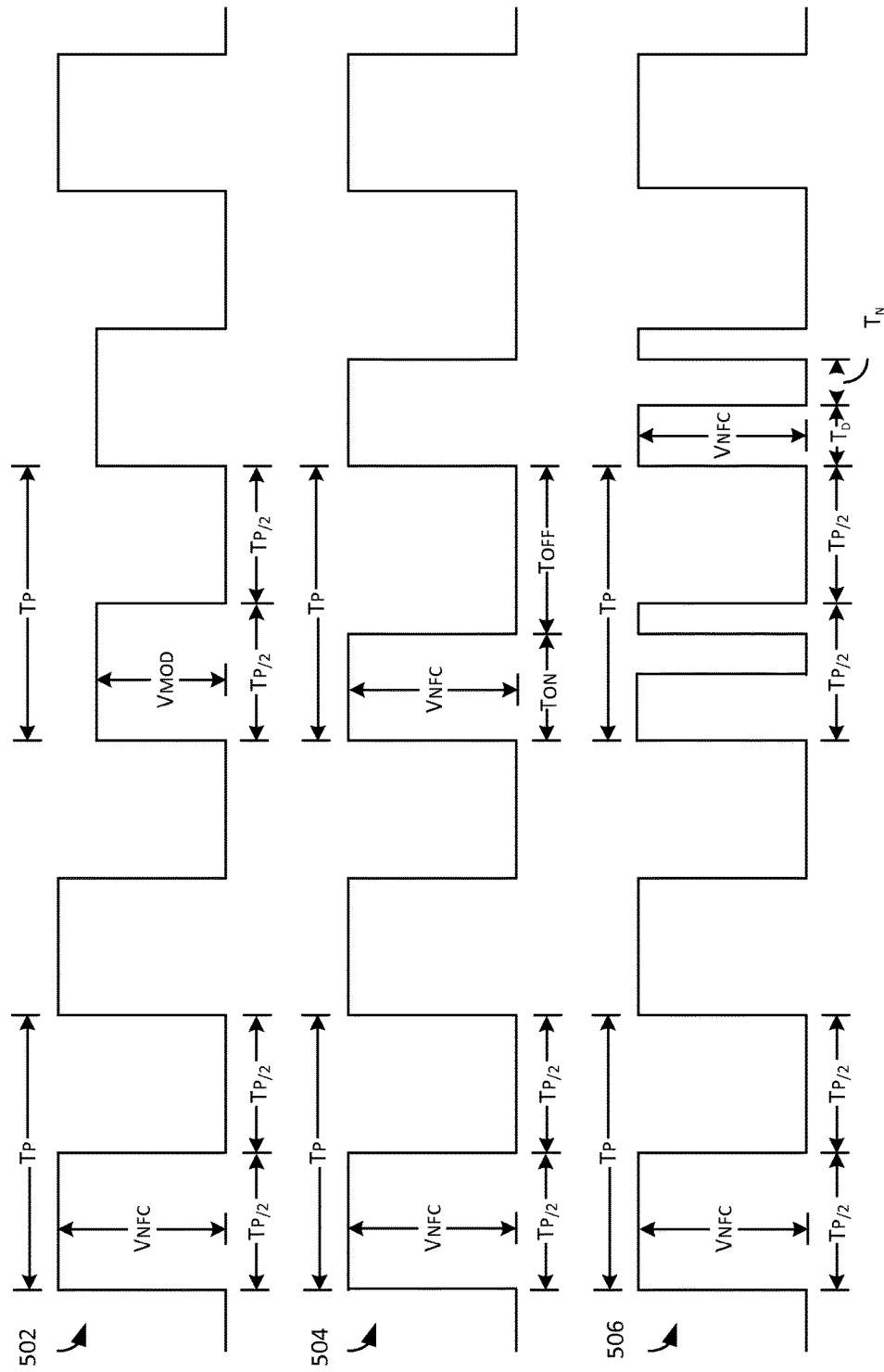
FIG. 5 depicts three exemplary waveforms according to different modulation procedures in accordance with some embodiments of the present disclosure.

FIG. 5 depicts three exemplary waveforms according to different modulation procedures in accordance with some embodiments of the present disclosure. The waveforms depicted in FIG. 5 may correspond to the positive transmit pin ($T_{XP}$) at the output of NFC chip 102 (e.g., from a processing unit of NFC chip 102) and that is provided to modulation circuit 110 of the transmit circuit of NFC circuit 100. A differential signal may be provided at the negative transmit pin ($T_{XN}$) and is not depicted in FIG. 5. Although other waveforms may be provided, in the embodiment depicted in FIG. 5, the waveforms may correspond to a voltage modulation procedure 502, a duty cycle modulation procedure 504, and a notch modulation procedure 506. In one embodiment, the modulation procedures depicted by the waveforms 502, 504, and 506 may result in amplitude modulation of the wireless data signal that is transmitted from antenna 140 via the transmit circuit of NFC circuit 100.

Voltage modulation procedure 502 may adjust the amplitude of the signal that is output from NFC chip 102 by lowering the voltage of a periodic signal during periods when the amplitude is to be modulated. Because the voltage modulation procedure requires modifying the voltage of the modulated signal, additional circuitry may be required within NFC chip 102 or modulation circuit 110 to implement the voltage modulation procedure. A periodic signal such as the carrier signal may have a frequency and associated period $T_P$. When data is transmitted, the voltage of the modulated signal may be reduced for those portions of the signal where it is desired to provide amplitude modulation in accordance with a communication protocol. For example, if the carrier signal has a voltage such as $V_{NFC}$, during modulation periods the voltage may be lowered by a percentage to a lesser voltage such as $V_{MOD}$, as is depicted in FIG. 5.

Duty cycle modulation procedure 504 may modify the pulse width of the modulated signal when the amplitude is to be modulated in response to data to be transmitted. In one embodiment, during periods when an amplitude modulated signal is to be output from the antenna 140 in response to data to be transmitted, the pulse width of the modulated signal is reduced. This reduction in the pulse width also reduces the energy of the signal that is provided to the transmit circuit of NFC circuit 100 during these periods, resulting in a reduction in the amplitude of the wireless data signal that is transmitted from antenna 140. As is depicted for duty cycle modulation procedure 504, the period from a rising edge of the transmitted signal to the next rising edge of the transmitted signal may be the same for portions of the signal when the carrier signal is being transmitted and portions of the signal when the signal is being modulated. However, the on time of the signal while it is being modulated ($T_{ON}$) may be less than the on-time while the carrier signal is being sent (e.g., $T_P/2$). Because the high voltage is provided for a smaller portion of the period when the signal is being modulated, the resulting wireless data signal that is transmitted from the antenna 140 will have a reduced amplitude during these periods. In this manner, the duty cycle modulation procedure 504 may provide for amplitude modulation of the wireless data signal.

The waveforms depicted for voltage modulation procedure 502 and duty cycle modulation procedure 504 may provide for amplitude modulation of the wireless data signal that is transmitted from antenna 140 via the transmit circuit of NFC circuit 100. However, implementing amplitude modulation with a voltage modulation procedure may require additional circuitry in order to adjust the voltage of the signal during the modulation periods. In some embodiments, this additional circuitry may add additional cost to the NFC chip 102 or modulation circuit 110 of payment reader 22. Because the duty cycle modulation procedure 504 does not require adjustment of the voltage during the modulation periods, the signal may be able to be provided via the NFC chip 102 and the modulation circuit 110. However, in some embodiments, during transitions from the unmodulated state to the modulated state (e.g., when the duty cycle changes) or vice-versa, a phase shift may occur in the wireless data signal that is transmitted by antenna 140. This phase shift may result in difficulties demodulating the data (e.g., at payment device 10) that is transmitted using this modulation procedure.

Notch modulation procedure 506 may provide for amplitude modulation without modifying the voltage of the modulated signal or causing a significant phase shift in the wireless data signal. Notch modulation procedure 506 may include a carrier portion and a notched portion, with the notched portion corresponding to portions of the signal that are modulated by data to be transmitted. The notched portions of the notch modulation procedure 506 may have an initial rising edge that occurs with the same timing as the rising edge of the carrier portions of the notched modulation waveform. The notched portion of the modulation signal remains at the high voltage after the initial rising edge for a delay time $T_D$. After the delay time $T_D$, the signal has a falling edge and remains low for a notch time $T_N$. The notched portion of the modulation signal has another rising edge at the end of the notch time $T_N$ and remains at the high voltage until the end of the period of the notched portion of the modulated signal, the final falling edge of which corresponds to the timing of the falling edge of the carrier portion of the modulated signal. In this manner, the notched portion as a whole has a similar pulse width as the carrier portion, except that the notch results in a reduction in the energy that is provided to the transmit circuit of NFC circuit 100 while the modulated signal is being modulated, resulting in modulation of the amplitude of the signal that is transmitted by antenna 140 of the NFC circuit 100.

Some communication protocols, such as a type-A modulation used for ISO 14443, may specify a modulation index for a wireless data signal. A modulation index may be represented as a percentage and may correspond to the amplitude modulation provided by the modulation procedure. For example, for type-A modulation a desired modulation index may range between 8%-14%, with a target modulation index of approximately 10%. The modulation index may be measured based on the received signal from the receive circuit, based on the measurement value determined from the measurement circuit, or any combination thereof. In one embodiment, parameters of the modulation procedures may be modified in order to achieve desired modulation index. For a voltage modulation procedure, the voltage $V_{MOD}$ may be increased or decreased to achieve a desired modulation index. A decrease in the voltage $V_{MOD}$ may result in an increase in the modulation index while an increase in the voltage $V_{MOD}$ may result in a decrease in the modulation index. For a duty cycle modulation procedure, the on time $T_{ON}$ may be increased to or decreased to achieve a desired modulation index, with an increase in the on time $T_{ON}$ resulting in a decrease in the modulation index and a decrease in the on time $T_{ON}$ resulting in an increase in the modulation index. With a notch modulation procedure, an increase in the notch width $T_N$ results in an increase in the modulation index, while a decrease in the notch width $T_N$ results in a decrease in the modulation index. In addition, the modulation index and phase of the wireless data signal may be modified based on changes in the notch delay $T_D$.

In one embodiment, values for the voltage $V_{MOD}$, on time $T_{ON}$, notch width $T_N$, or notch delay $T_D$ may be associated with a modulation index, such that a processing unit of NFC chip 102 can determine a value to use for the modulation procedure based on a desired modulation index. A data structure may be stored in memory that associates a modulation index with these values. In some embodiments, values used for the modulation procedure may be adjusted or set based on feedback relating to the modulation index. A processing unit of NFC chip 102 may monitor the receive circuit of NFC circuit 100 or measurement circuit 150, and based on data received from one or both of these interfaces, determine the actual modulation index and adjust the values provided for a modulation procedure to match a desired modulation index.

Figure 6:
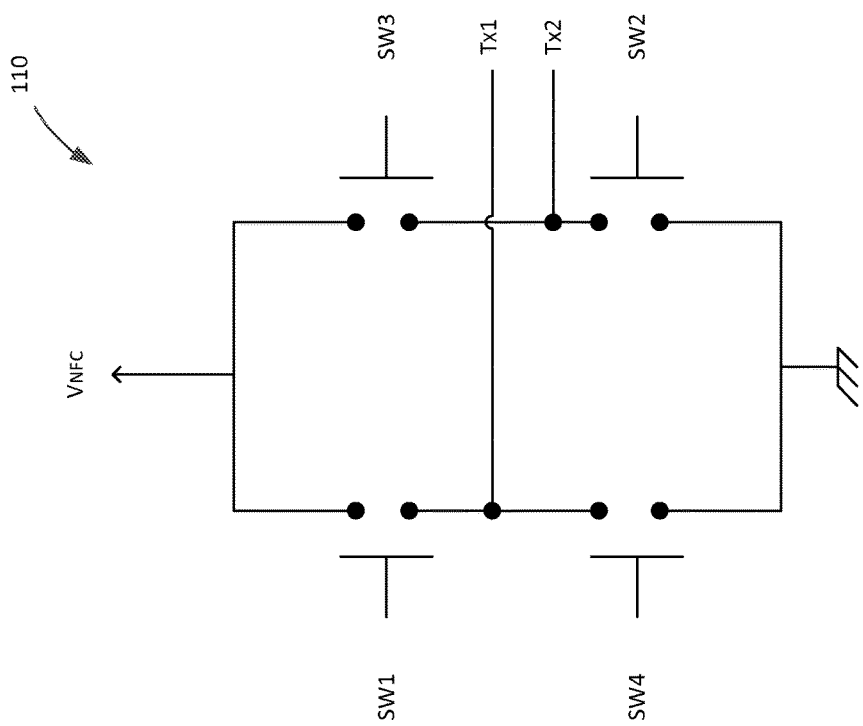
FIG. 6 depicts an exemplary H-bridge modulation circuit in accordance with some embodiments of the present disclosure.

FIG. 6 depicts an exemplary H-bridge modulation circuit 110 in accordance with some embodiments of the present disclosure. In some embodiments, the H-bridge circuit may function as a voltage boost for the outputs of the NFC chip 102. For example, NFC chip 102 may provide output signals having a voltage such as 3.3 volts, while the H-bridge circuit may be capable of applying a higher voltage such as 12 volts. By providing the outputs of NFC chip 102 to the appropriate inputs of the H-bridge circuit, the voltage that is provided to the other components of NFC circuit 100 may be increased to the voltage of the H-bridge circuit $V_{NFC}$, which may be a higher voltage such as 12 volts.

The H-bridge circuit of FIG. 6 may have a first rail coupled to the NFC voltage $V_{NFC}$ and a ground rail coupled to ground. A first switch SW1 selectively couples $V_{NFC}$ to the first portion of the transmit circuit of the NFC circuit 100 ($T_X1$). Similarly, a switch SW4 selectively connects $T_X1$ to ground. In this manner, either $V_{NFC}$ or ground is provided to $T_X1$ based on the values of SW1 and SW4. In a similar manner, a switch SW3 selectively couples $V_{NFC}$ to the second portion of the transmit circuit of the NFC circuit 100 ($T_X2$) and a switch SW2 selectively couples $T_X2$ to ground.

In one embodiment, the H-bridge circuit may function as a voltage boost circuit for a signal output from NFC chip 102. For example, if the output labeled as $T_{XP}$ from NFC chip 102 in FIG. 3 is provided to SW1 and an inverted version of that output is provided to SW4, the resulting output from the H-bridge circuit to $T_X1$ will be a voltage boosted version (e.g., to $V_{NFC}$) of the $T_{XP}$ output from the NFC chip 102. In a similar manner, the $T_{XN}$ output from the NFC chip 102 of FIG. 3 may be provided to SW3 and in an inverted version of $T_{XN}$ may be provided SW2, such that the H-bridge outputs a voltage-boosted version (e.g., to $V_{NFC}$) of $T_{XN}$ to $T_X2$.

In some embodiments, the input signals to the switches SW1-SW4 of the H-bridge circuit may be selectively controlled to implement a delayed H-bridge modulation procedure. In a delayed H-bridge modulation procedure, the inputs to the switches may be controlled such that transitions between $V_{NFC}$ and ground are delayed for one of $T_X1$ or $T_X2$. This delayed H-bridge waveform may provide desirable signal characteristics for the wireless data signal when a payment reader 22 is located at certain distances from a payment device 10. For example, a delayed H-bridge modulation procedure may provide for desirable power and modulation characteristics when the payment reader 22 and electronic device 10 are located within close proximity to each other (e.g., less than 1 cm).

Figure 7:
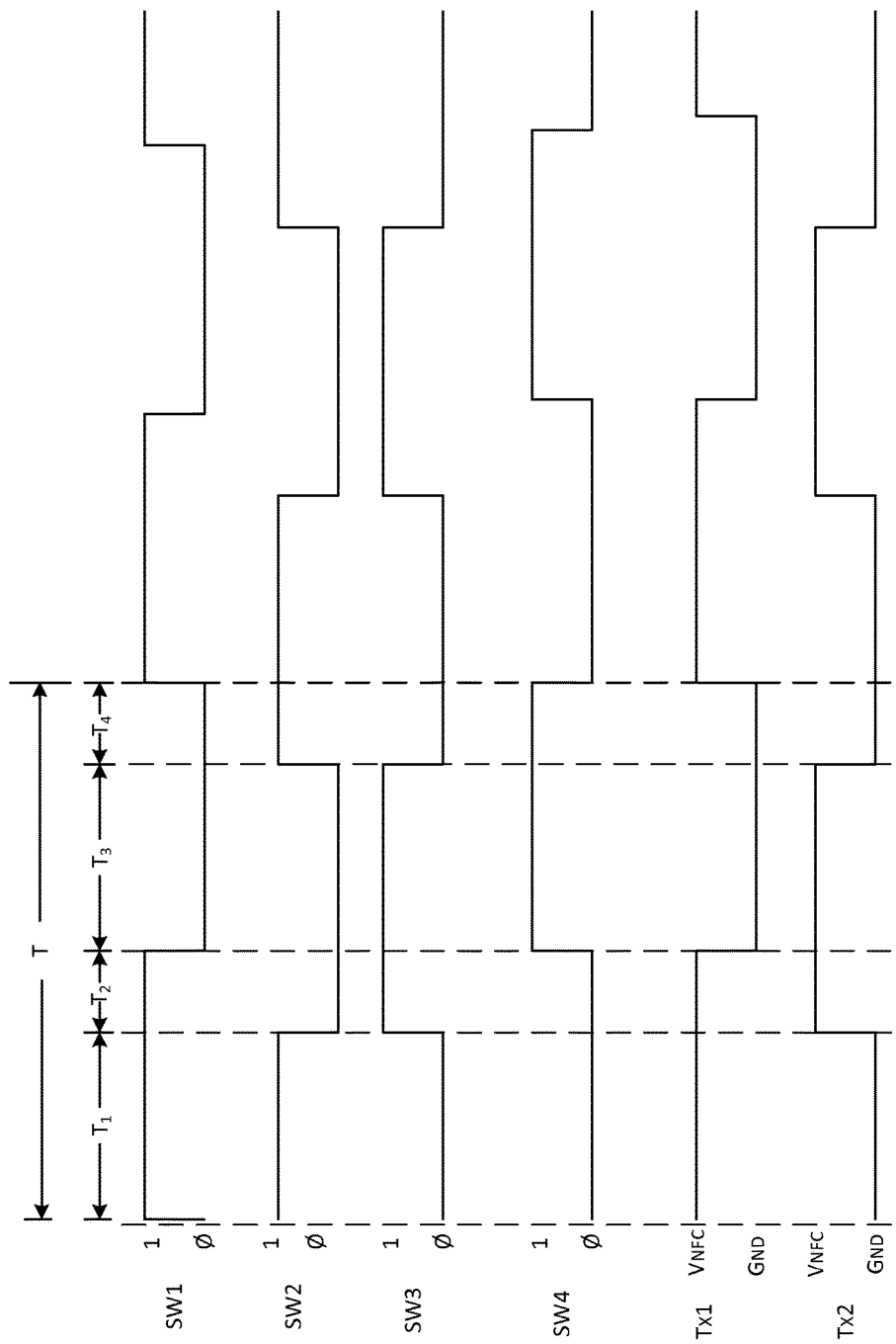
FIG. 7 depicts exemplary switch inputs and waveform outputs to implement a delayed H-bridge modulation procedure in accordance with some embodiments of the present disclosure.

FIG. 7 depicts exemplary switch inputs and waveform outputs to implement a delayed H-bridge modulation procedure in accordance with some embodiments of the present disclosure. For each of the switch inputs of SW1 through SW4, FIG. 7 depicts the status either at a 0 or 1, with 1 indicating that the switch is closed and 0 indicating that the switch is open. For each of the H-bridge outputs of $T_X1$ and $T_X2$, the respective output is depicted in FIG. 7 as either being at $V_{NFC}$ or ground. A period for the delayed H-bridge waveform is depicted in FIG. 7 as period T.

During a first portion $T_1$ of period T, SW1 is closed and SW4 is open, resulting in $T_X1$ being connected to $V_{NFC}$. Also during the first portion $T_1$ of period T, SW2 is closed and SW3 is open, resulting in the coupling of $T_X2$ to ground. Thus, there is a voltage differential ($V_{NFC}$ for $T_{X1}$ and GND for $T_{X2}$) provided to the first and second portions of the transmit circuit during time $T_1$. During a first transition portion $T_2$, SW1 remains closed and SW4 remains open, such that $T_X1$ remains coupled to $V_{NFC}$. However, SW2 transitions to open and SW3 transitions to closed, such that $T_X2$ is also coupled to VNFC. Thus, during this transition period $T_2$ both $T_X1$ and $T_X2$ are coupled to $V_{NFC}$, resulting in no voltage differential between the first and second portions of the transmit circuit. At the end of the transition period $T_2$, SW1 and SW4 switch states such that $T_X1$ is coupled to ground, while $T_X2$ remains coupled to $V_{NFC}$ for time $T_3$. Thus, there is a voltage differential ($V_{NFC}$ for $T_{X2}$ and GND for $T_{X1}$) provided to the first and second portions of the transmit circuit during time $T_3$. Finally, during a second transition period $T_4$, switches SW2 and SW3 switch states such that $T_X2$ is again coupled to ground. During this second transition period $T_4$ both $T_X1$ and $T_X2$ are coupled to ground. Thus, during this transition period $T_4$ both $T_X1$ and $T_X2$ are coupled to GND, resulting in no voltage differential between the first and second portions of the transmit circuit. The cycle then repeats at the end of the second transition period $T_4$.

Figure 8:
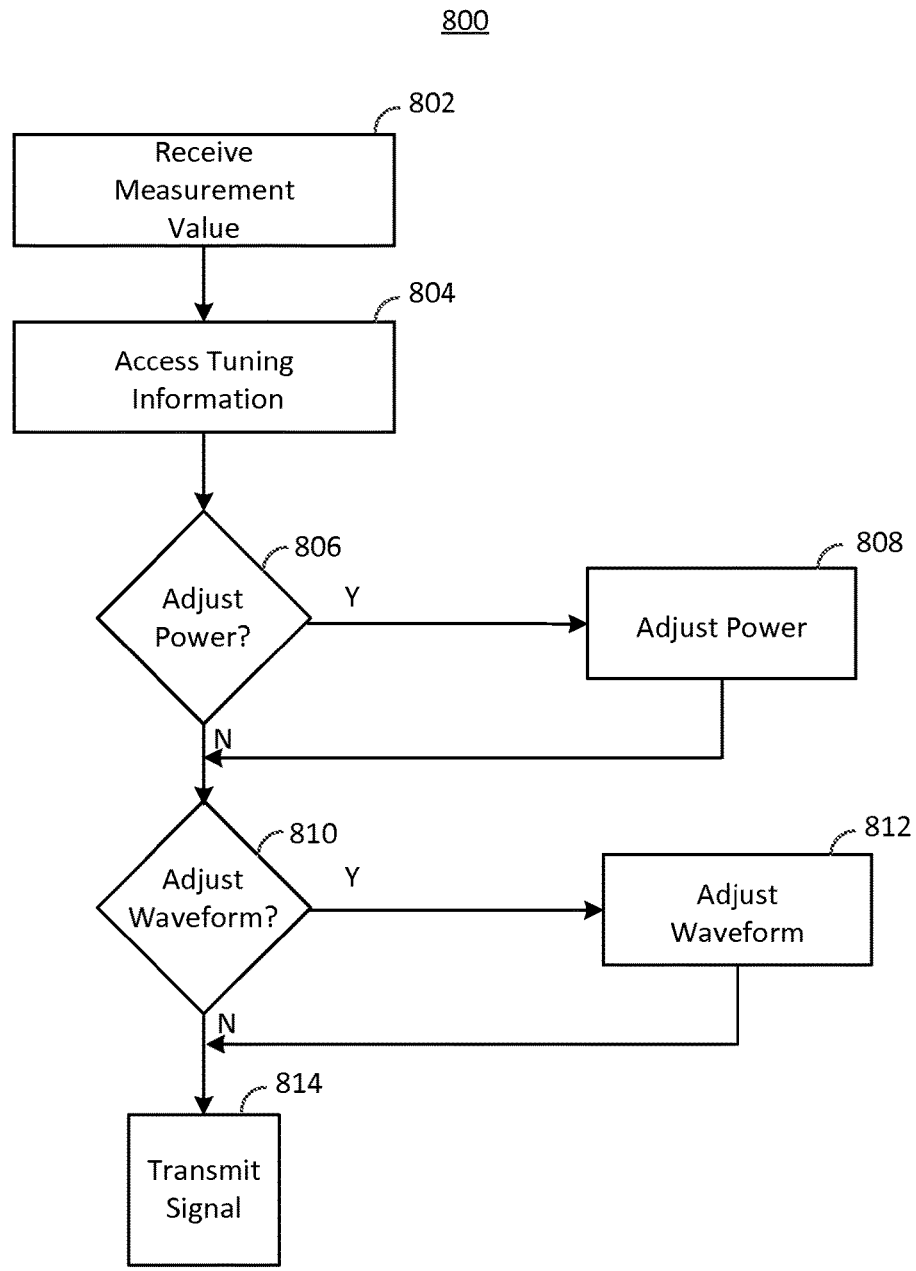
FIG. 8 depicts steps for modifying a transmitted signal from a payment reader in response to a measured value representative of the wireless carrier signal.
Figure 9:
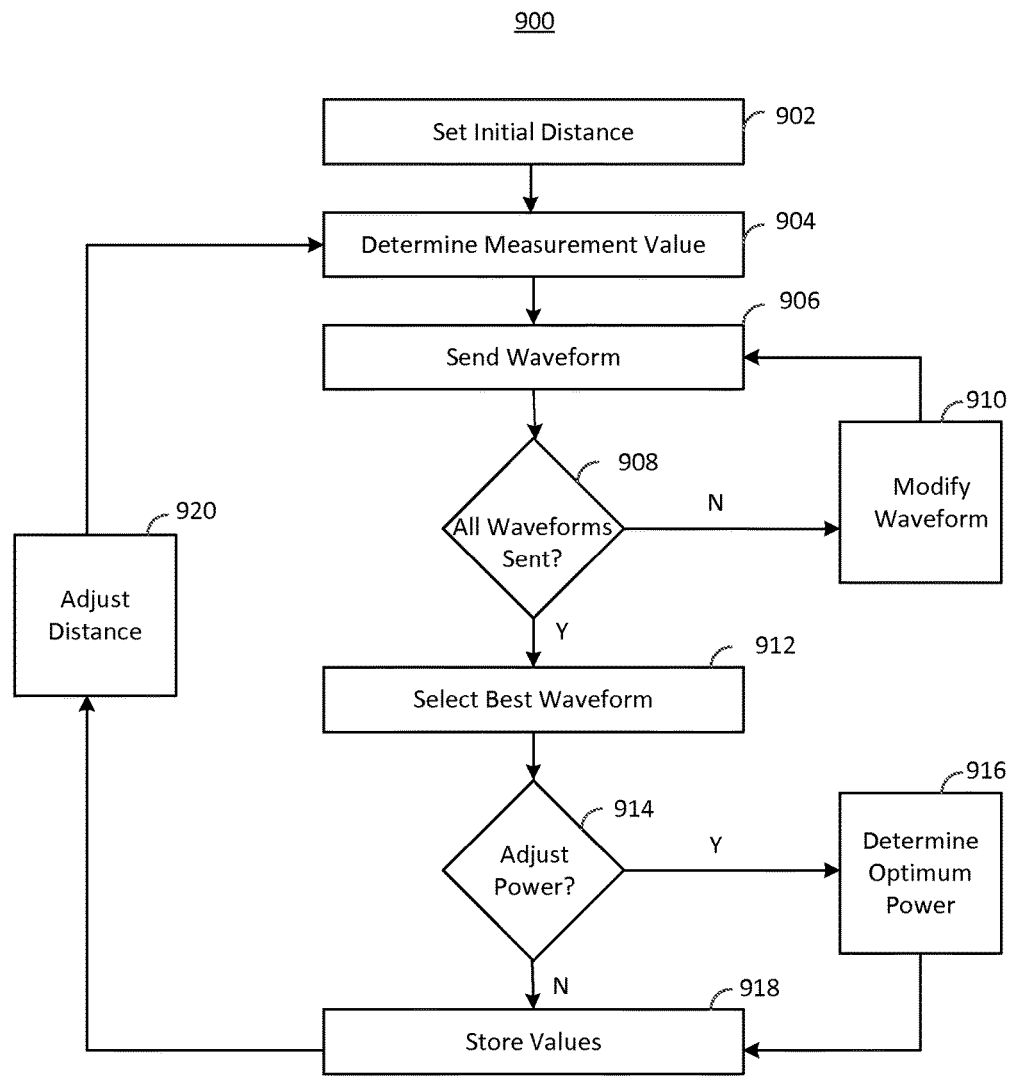
FIG. 9 depicts exemplary steps for generating a modulation table in accordance with some embodiments of the present disclosure.

In view of the structures and devices described supra and infra, methods that can be implemented in accordance with the disclosed subject matter will be better appreciated with reference to the flowcharts of FIGS. 8-9. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 8 depicts steps 800 for modifying a transmitted signal from a payment reader 22 in response to a measured value representative of the wireless carrier signal. At step 802, NFC chip 102 may receive a signal representative of characteristics of the wireless carrier signal from measurement circuit 150. In one embodiment, measurement circuit 150 may be connected to antenna 140 and thus may receive a signal representing the inductive coupling of the signal between the antennas of the payment reader 22 and payment device 10. The strength of the coupled signal may be based on factors such as the distance between the payment reader 22 and the electronic device 10, the orientation of the antennas of the payment reader 22 and electronic device 10 relative to each other, as well as the physical packaging of one or more of payment reader 22 and electronic device 10. Once this signal is received at NFC chip 102, NFC chip 102 may determine a measurement value based on the inductively coupled signal and processing may continue to step 804.

At step 804, the processor of NFC chip 102 may access tuning information (e.g., tuning information stored in a memory of NFC chip 102). The tuning information includes parameters for payment reader 22 to determine the appropriate signals to transmit based on the distance of the electronic device 10 from the payment reader 22. In one embodiment, the tuning information may have been determined according to the steps depicted and described in FIG. 9, infra. Tuning information may be stored as a lookup table, database, or any other suitable data structure. For example, tuning information may be a data structure that associates a measurement value with parameters for a signal to be transmitted by payment reader 22. Thus, in one embodiment, the measurement value may be used to access information for adjusting the parameters of the transmitted signal from payment reader 22. Once the tuning information has been accessed based on the measurement value, processing may continue to step 806.

At step 806, it may be determined whether the transmit power of the NFC circuit 100 needs to be adjusted based on the tuning information. Because of the complex coupling characteristics between payment reader 22 and electronic device 10 within the near field, it may be desired to adjust the power of the transmitted signal to correspond to a suitable transmit power value. At step 806, the processor may determine whether the current transmit power corresponds to the transmit power that was accessed from the tuning information. This may be determined based on a parameter that corresponds to the power that is supplied to the NFC circuit, or in some embodiments, may be based on a measured power (e.g., from the receive path of the NFC circuit). If the current transmit power is correct (e.g., is within a threshold of the transmit power value that was accessed from the tuning information) then processing may continue to step 810. If the current transmit power is not set to the desired transmit value accessed from the tuning information, processing may continue to step 808.

At step 808, the transmit power may be adjusted to match the transmit power accessed from the tuning information. The power that is supplied to the NFC circuit may be adjusted, or in some embodiments, the transmit power may be determined based on feedback related to the measured power (e.g., from the receive path of the NFC circuit).

At step 810, it may be determined whether the modulation procedure used to generate the modulated signal should be adjusted based on the measurement value. As a result of the inductive coupling of the payment reader 22 and the electronic device 10, different procedures for generating the waveform of the transmitted signal (e.g., the wireless carrier signal and wireless data signal) and modulating that signal may impact characteristics of the coupled signal. Certain modulation procedures may result in a higher signal quality at different distances. For example, some modulation procedures may be better suited for situations where the payment device 10 is located very close to the payment reader 22 within the near field, while some modulation procedures may be better suited to situations where the payment device 10 is located at the far reaches of the range of the near field with respect to the payment reader 22.

Modulation procedures may be used by the NFC chip 102 to generate a modulated signal, which in turn is provided to the NFC circuit 100 to be transmitted as the wireless data signal. The modulation procedure may include a modulation waveform type and parameters of the waveform such as signal levels, duty cycles, delay times, modulation techniques, and other waveform characteristics. Some or all of these aspects of the modulation procedure may be adjusted based on the measurement value. If it is determined that step 810 that the modulation procedure should be adjusted, processing may continue to step 812. If the modulation procedure should not be adjusted, processing may continue to step 814.

At step 812, the modulation procedure may be adjusted based on the measurement value. A modulation table of the tuning information may include data that associates known measurement values with certain modulation procedures (e.g., an amplitude modulation procedure, duty cycle modulation procedure, notch modulation procedure, or delayed H-bridge modulation procedure) and parameters for each of the modulation procedures. The known measurement values may be associated with known relationships relating to the relative location, orientation, and physical materials of the payment reader 22 and a payment device 10 (e.g., a typical payment device), although in some embodiments different modulation tables may be associated with different types of devices.

In one embodiment, the processor of NFC chip 102 may access the modulation table or other criteria from memory to adjust the modulation procedure based on the measurement value (e.g., selecting between modulation procedures such as voltage modulation, a duty cycle modulation, a notch modulation, or delayed H-bridge modulation, and adjusting the parameters of the modulation procedure). For example, it may be determined that when the measurement value is associated with a distance that is less than a threshold, a modulation procedure such as a delayed H-bridge modulation procedure should be used, and when the measurement value corresponds to a distance that is greater than the threshold, a modulation procedure such as a notch modulation procedure should be used. Once the modulation procedure is selected, the parameters for the waveform may also be modified based on the measurement value and information from the modulation table. In this manner, the modulation procedure may be determined and processing may continue to step 814.

At step 814, NFC chip 102 may generate a modulated signal to be provided to NFC circuit 100 for transmission as the wireless data signal. The modulation signal may be based on data to be transmitted, the carrier signal, a signaling technique (e.g., type-A or type-B for ISO 14443 communications), and the selected modulation procedure. The power of the modulated signal may also be adjusted by circuitry of NFC chip 102 and/or NFC circuit 100, such that the wireless data signal is transmitted based on the power and modulation procedure determined at steps 802 through 812.

This wireless data signal may continue to be transmitted in this manner until a measurement value is received that indicates that the modulation procedure or power should be changed. In one embodiment, the determination of whether the measurement value requires a change in the modulation procedure or the power may be based on whether the measurement value has changed by more than a threshold. In another embodiment, the modulation procedure or the power may be continuously adjusted as the measurement value changes.

FIG. 9 depicts exemplary steps 900 for generating tuning information such as a modulation table in accordance with some embodiments of the present disclosure. Steps 900 may be performed with a payment reader 22, a payment device 10, and a test system including measurement and communication circuitry for determining characteristics of the near field 15 as well as signals of payment reader 22 and payment device 10. This measurement and communication circuitry may determine characteristics such as the transmit power from payment reader 22, characteristics of the wireless carrier signal (e.g., frequency, phase, waveform morphology, and amplitude), characteristics of the modulated wireless carrier signal (e.g., frequency, phase, waveform morphology, and amplitude), characteristics of the wireless data signal (e.g., frequency, phase, waveform morphology, and amplitude), receive sensitivity of one or both of payment reader 22 and payment device 10 (e.g., the ability of the payment reader 22 or payment device 10 to receive and demodulate a modulated wireless carrier signal or wireless data signal), and a modulation index (e.g., a modulation index indicative of the amplitude modulation for a type-A signaling). This information may be collected and processed as described at steps 900 to determine the tuning information (e.g., populate the modulation table) for use during the operation of payment reader 22.

At step 902, an initial distance between the payment reader 22 and the payment device 10 may be set. Although an initial distance may be set at any suitable manner, in one embodiment the initial distance may correspond to a desired maximum range for the near field 15 at which it is expected that the payment reader 22 and payment device 10 should be able to communicate. This initial distance may also take into account the orientation of the payment reader 22 and the payment device 10 relative to each other. Once an initial distance is set, processing may continue to step 904.

At step 904, a wireless carrier signal may be provided from payment reader 22 and a measurement value may be received at measurement circuit 150 of payment reader 22 and provided to the NFC chip 102. The test system may determine this measurement value from payment reader 22, for example, by communicating with NFC chip 102 of payment reader 22 or measuring a value of a signal associated with the measurement value. The measurement value may then be associated with the distance between the payment reader 22 and payment device 10 such that the association between the distance and the measurement value is known. Once the measurement value has been determined, processing may continue to step 906.

At step 906, a wireless data signal may be sent by payment reader 22 according to a modulation procedure. For example, the test system may communicate with a processor of NFC chip 102 such that the modulated signal is generated according to a particular modulation procedure and the wireless data signal is transmitted by the antenna 140 of the NFC circuit based on that modulated signal. Data may be communicated based the wireless data signal and the payment device 10 may receive and process the wireless data signal. Based on communications with the payment device 10 or measurements performed at the payment device 10 (e.g., a custom payment device including circuitry for providing measurements to the test system), measurements of the characteristics of the wireless data signal received at payment device 10 may be captured. These captured measurements may be stored to be compared with measurements associated with other modulation procedures. Once the captured measurements have been stored for a particular modulation procedure, processing may continue to step 908.

At step 908, the test system may determine whether wireless data signals associated with all of the modulation procedures of interest have been sent. For example, one or both of the type of modulation (e.g., voltage modulation, duty-cycle modulation, H-bridge modulation, and notch modulation) and parameters for each type of modulation may be changed for a modulation procedure. A plurality of modulation procedures may thus be available for processing by payment reader 22, payment device 10, and the test system. If all of the modulation procedures associated with a distance have not been tested for the particular distance, processing may continue to step 910. At step 910 the next modulation procedure associated with the distance may be selected, and processing may return to step 906 at which the modulated signal is based on the newly-selected modulation procedure. Once all modulation procedures associated with the distance have been sent and measurements accumulated for each of the modulation procedures, processing may continue to step 912.

At step 912, the test system may determine which modulation procedure to use for the distance and store information related to the modulation procedure and the measurement value as tuning information such as a modulation table. Although any suitable criteria may be used for this determination, in one embodiment a first test may determine which modulation procedures meet a minimum criteria for one or more measured characteristics (e.g., transmit power, transmit waveform, receive sensitivity, and modulation index). Of the modulation procedures that meet the minimum requirements for the one or more measured characteristics, the best modulation procedure may be selected based on the degree to which the measured characteristics for each modulation procedure correspond to desired values for the one or measured characteristics. For example, each measured characteristic may be weighted, and the modulation procedure may be selected based on the weighting and the degree to which the one or more measured characteristics exceed a threshold. For example, the modulation procedure may be selected based on the degree to which the transmit power, transmit waveform, received sensitivity, and modulation index thresholds are exceeded, and a weighting value for each of these measured characteristics. Once the modulation procedure for the distance has been selected, the modulation procedure and the measurement value associated with the distance may be stored in the modulation table, and processing may continue to step 914.

At step 914, it may also be determined whether to adjust the power of the transmitted signal. If the transmit power is not to be adjusted, processing may continue to step 918. If it is desired to also determine an optimum power value, processing may continue to step 916. At step 916, payment reader 22 may transmit a signal according to the selected modulation procedure at a number of different transmit power values, such that the measured characteristics may be assessed at each of the transmit power values for the modulation procedure. In a similar manner as step 912, the optimum transmit power value may be selected based on the measured characteristics. As adjusting the power may also change the measurement value, the measurement value may also be determined. Once the optimum transmit power has been determined, this value may be stored as the tuning information (e.g., the modulation table) along with the measurement value, and processing may continue to step 918.

At step 918, the measurement value, modulation procedure, transmit power, and any other parameters determined in steps 904-916, may be saved to as the turning information (e.g., the modulation table). Processing may then continue to step 920. At step 920, the distance between the payment reader 22 and the payment device 10 may be adjusted. In one embodiment, if the initial distance was at the edge of the near field 15, the payment reader 22 and the payment device 10 may be moved closer together. The processing steps 904-920 may then be continued until measurements have been obtained for a complete range of distances between payment reader 22 and payment device 10.

Once the test system has acquired data for a suitable range of distances, the data stored as the tuning information may be saved as a data structure in memory of payment reader 22 (e.g., in a memory of NFC chip 102 to be accessed by a processor of NFC chip 102).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader for communicating with a contactless payment device via a wireless data signal, the payment reader comprising:
   an antenna;
   a processing unit configured to generate a carrier signal, wherein the processing unit is further configured to modify the carrier signal to generate a modulated signal, wherein the carrier signal is modified based on data to be transmitted to the contactless payment device and a modulation procedure, wherein the modulation procedure comprises a notch modulation procedure having a notch delay and a notch width, and wherein the processing unit is configured to select the notch delay and the notch width to determine a desired modulation index of the wireless data signal;
   a transmit circuit configured to receive the modulated signal from the processing unit, generate the wireless data signal based on the modulated signal, and provide the wireless data signal to the antenna, wherein the antenna is configured to transmit the wireless data signal;
   a receive circuit configured to receive a modulated wireless carrier signal and provide a received signal that is based on the modulated wireless carrier signal to the processing unit, wherein the modulated wireless carrier signal is based on the carrier signal, and wherein the processing unit is configured to determine received data based on the received signal.

2. The payment reader of claim 1, wherein the frequency of the carrier signal is approximately 13.56 MHz and wherein the desired modulation index is approximately 10%.

3. The payment reader of claim 1, wherein the frequency of the carrier signal is approximately 13.56 MHz and wherein the desired modulation index is in a range of 8-14%.

4. The payment reader of claim 1, wherein the processing unit is configured to determine a measured modulation index of the transmitted wireless data signal, compare the measured modulation index to the desired modulation index, and modify the notch width based on the comparison.

5. A communication device comprising:
   an antenna;
   a processing unit configured to generate a carrier signal, wherein the processing unit is further configured to modify the carrier signal to generate a modulated signal, wherein the carrier signal is modified based on data to be transmitted and a modulation procedure, wherein the modulation procedure comprises a notch modulation procedure having a notch delay and a notch width, and wherein the processing unit is configured to select the notch width and the notch delay based on a desired modulation index of a wireless data signal; and a transmit circuit configured to receive the modulated signal, generate the wireless data signal based on the modulated signal, and provide the wireless data signal to the antenna, wherein the antenna is configured to transmit the wireless data signal.

6. The communication device of claim 5, further comprising a receive circuit configured to receive a modulated wireless carrier signal and provide a received signal that is based on the modulated wireless carrier signal to the processing unit, wherein the modulated wireless carrier signal is based on the carrier signal, and wherein the processing unit is configured to determine received data based on the received signal.

7. The communication device of claim 5, wherein the processing unit is configured to determine a measured modulation index of the transmitted wireless data signal, compare the measured modulation index to the desired modulation index, and modify the notch width based on the comparison.

8. The communication device of claim 7, wherein the processing unit is configured to modify the notch delay based on the comparison.

9. The communication device of claim 5, wherein the frequency of the carrier signal is approximately 13.56 MHz and wherein the desired modulation index is approximately 10%.

10. The communication device of claim 5, wherein the frequency of the carrier signal is approximately 13.56 MHz and the desired modulation index is in a range of 8-14%.

11. The communication device of claim 5, wherein the transmit circuit comprises:

a voltage boost circuit configured to receive the modulated signal and output an enhanced signal, wherein the waveform of the enhanced signal corresponds to the modulated carrier signal and the voltage of the enhanced signal is greater than the modulated carrier signal; and a matching network configured to receive the enhanced signal, generate the wireless data signal based on the enhanced signal, and provide the wireless data signal to the antenna.

12. A method for wireless communications comprising:
generating a carrier signal;
selecting a notch width of a notch modulation procedure and a notch delay of the notch modulation procedure, based on a desired modulation index of a wireless data signal;
modulating the carrier signal based on data to be transmitted and the notch modulation procedure;
generating the wireless data signal based on the modulated carrier signal; and
transmitting the wireless data signal.

13. The method of claim 12, further comprising:
receiving a modulated wireless carrier signal;
generating a received signal based on the modulated wireless carrier signal, wherein the modulated wireless carrier signal is based on the carrier signal; and
determining received data based on the received signal.

14. The method of claim 12, further comprising:
determining a measured modulation index of the transmitted wireless data signal;
comparing the measured modulation index to the desired modulation index; and
modifying the notch width based on the comparison.

15. The method of claim 14, further comprising modifying the notch delay based on the comparison.

16. The method of claim 12, wherein the frequency of the carrier signal is approximately 13.56 MHz and wherein the desired modulation index is approximately 10%.

17. The method of claim 12, wherein the frequency of the carrier signal is approximately 13.56 MHz and the desired modulation index is in a range of 8-14%.

18. The method of claim 12, wherein generating a wireless data signal based on the modulated carrier signal comprises:
receiving the modulated carrier signal;
boosting the voltage of the modulated carrier signal to provide an enhanced signal, wherein the waveform of the enhanced signal corresponds to the modulated carrier signal and the voltage of the enhanced signal is greater than the modulated carrier signal; and
generating the wireless data signal based on the enhanced signal.

19. A non-transitory computer-readable storage medium comprising instructions stored therein, which when executed by one or more processors, cause the one or more processors to perform operations comprising:
generating a carrier signal;
selecting a notch width of a notch modulation procedure and a notch delay of the notch modulation procedure, based on a desired modulation index of a wireless data signal;
modulating the carrier signal based on data to be transmitted and the notch modulation procedure; and
providing the modulated carrier signal to a transmit circuit, wherein the transmit circuit is configured to generate the wireless data signal based on the modulated carrier signal.

20. The non-transitory computer-readable storage medium of claim 19, wherein the instructions further comprise instructions that cause the one or more processors to perform operations comprising:
receiving a received signal, wherein the received signal is based on a modulated wireless carrier signal and wherein the modulated wireless carrier signal is based on the carrier signal; and
determining received data based on the received signal.

21. The non-transitory computer-readable storage medium of claim 19, wherein the instructions further comprise instructions that cause the one or more processors to perform operations comprising:
determining a measured modulation index of the transmitted wireless data signal;
comparing the measured modulation index to the desired modulation index; and
modifying the notch width based on the comparison.

22. The non-transitory computer-readable storage medium of claim 21, wherein the instructions further comprise instructions that cause the one or more processors to perform operations comprising modifying the notch delay based on the comparison.

23. The non-transitory computer-readable storage medium of claim 19, wherein the frequency of the carrier signal is approximately 13.56 MHz and wherein the desired modulation index is approximately 10%.

24. The non-transitory computer-readable storage medium of claim 19, wherein the frequency of the carrier signal is approximately 13.56 MHz and the desired modulation index is in a range of 8-14%.

25. The non-transitory computer-readable storage medium of claim 19, wherein the instructions further comprise instructions that cause the one or more processors to perform operations comprising providing the modulated carrier signal to a voltage boost circuit of the transmit circuit,
   wherein the voltage boost circuit is configured to boost the voltage of the modulated carrier signal to provide an enhanced signal, and
   wherein the waveform of the enhanced signal corresponds to the modulated carrier signal and the voltage of the enhanced signal is greater than the modulated carrier signal.

\* \* \* \* \*